May 23, 1967 J. J. AMODEI 3,321,640

ELECTRICAL CIRCUIT

Filed May 4, 1964

INVENTOR.
JUAN J. AMODEI
BY John V. Regan
Attorney

United States Patent Office 3,321,640
Patented May 23, 1967

3,321,640
ELECTRICAL CIRCUIT
Juan J. Amodei, Levittown, Pa., assignor to Radio Corporation of America, a corporation of Delaware
Filed May 4, 1964, Ser. No. 364,416
10 Claims. (Cl. 307—88.5)

This invention relates to electrical circuits and, in particular, to improved high speed trigger circuits.

The maximum operating speed of many trigger circuits is limited by the input network rather than by the switching speed of the element or elements to be triggered. In known tunnel diode trigger circuits that employ current steering, for example, the diode's two terminals are connected to a common input terminal by way of separate input paths. Current supplied over one of these paths tends to switch the diode to a first stable state, and current supplied over the other path tends to switch the diode to a second stable state. The operating speed of the circuit is a function of the amplitude of the trigger input current and the efficiency with which this current may be steered over a selected one of the two input paths.

Such circuits generally rely on the voltages at the diode's terminals to control the steering of the input current in the input paths. However, the voltage across the diode is less than about 100 millivolts for one stable state of the diode and may be less than about 300 millivolts, depending on the diode, for the other stable state. The small difference in voltage across the diode is insufficient to effect steering of all of the input current over a selected one of the input paths, except for very small amplitude input currents. However, operating speed is dependent in part on the amplitude of the input current. For a large amplitude input, some current flows over the nonselected path and, in the prior art arrangements, this latter current tends to counteract the switching effect of a like amount of current flowing in the selected input path.

It is one object of this invention to provide a trigger circuit that has an improved switching mechanism.

It is another object of this invention to provide an improved trigger circuit in which current supplied over the non-selected input path does not cancel the switching effect of a like current flowing in the selected input path.

It is still another object of this invention to provide a negative resistance diode trigger circuit in which the direction of input current flow through the diode is controlled by the impedances at the diode's terminals.

Briefly stated, the invention includes a pair of coupling elements each connected to supply input trigger current at a different terminal of a bistably biased negative resistance diode, preferably a tunnel diode. A first threshold device is connected at one terminal of the diode and has a threshold of conduction that is exceeded when the diode is in a first one of its stable states but not the other. A second threshold device is connected at the other terminal of the diode and has a threshold of conduction that is exceeded when the diode is in the other stable state, but not the first stable state. These latter devices provide low impedance paths, when conducting, for controlling the direction of input current flow through the diode. They also provide voltage clamping action at the respective terminals. Switching speed and efficiency may be further enhanced if the coupling elements are unidirectional conducting elements and a selected one of the unidirectional conducting elements has a lower threshold of conduction than the other element.

In the accompanying drawing, like reference characters denote like components, and:

Figure 1:
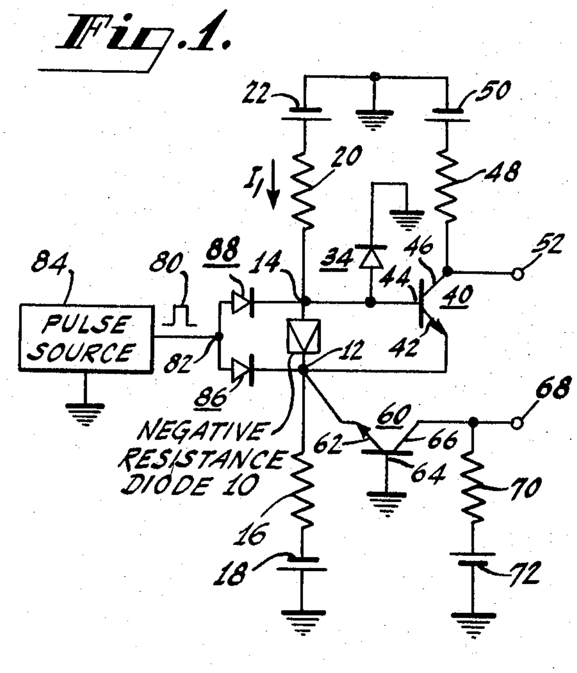
FIGURE 1 is a schematic diagram of one embodiment of the invention.

In FIGURE 1, a negative resistance diode 10, which may be, for example, a tunnel diode, has its cathode connected at a first common point 12 and has its anode connected at a second point 14. A current supply means, illustrated as the series combination of a resistor 16 and a battery 18, is connected between first junction point 12 and a point of reference potential, indicated by the conventional symbol for circuit ground. Battery 18 has its positive terminal grounded and has its negative terminal connected at the lower end of resistor 16. As will be explained more fully hereinafter, battery 18 and resistor 16 serve to supply a substantially constant current at the junction 12. A second resistor 20 is connected between the second junction 14 and a source of positive bias potential, illustrated as a battery 22 having its negative terminal grounded. The battery 22 and resistor 20 supply a substantially constant current $I_1$ at the second junction point 14, and are chosen in value to bias the negative resistance diode 10 bistably.

A first transistor 40, illustrated as an NPN transistor, has its emitter electrode 42 and its base electrode 44 respectively connected to the first and second junction points 12 and 14, whereby the emitter 42-base 44 junction, or diode, is connected in parallel with the diode 10. A first unidirectionally conducting threshold device, illustrated as a diode 34, has its anode connected in common to the second junction 14 and base 44, and has its cathode grounded. It will be noted that the easy current flow direction across the emitter 42-base 44 junction, and the direction of forward current through the diodes 10 and 34 are all the same with respect to second junction 14. For reasons to be explained, diode 34 is chosen to have a higher threshold of conduction than the emitter 42-base 44 junction.

A current supply resistor 48 and a battery 50 are serially connected between the collector electrode 46 and circuit ground. Battery 50 has its negative terminal grounded, whereby the collector 46-base 44 junction is reverse-biased. A first output terminal 52 is connected to the collector electrode 46. A second NPN transistor 60 has its emitter 62-base 64 junction connected between the first junction point 12 and circuit ground. Its collector electrode 66 is connected to a second output terminal 68, and by way of a resistor 70 and battery 72 to circuit ground. As will be described, the emitter 62-base 64 junction of second transistor 60 serves the important function of a threshold device for impedance control purposes.

Positive going trigger input pulses 80 of current are supplied at a common input terminal 82 from a pulse source 84. A first unidirectional conducting device, illustrated as a diode 86, is connected between input terminal 82 and first junction point 12. A second such device 88 is connected between input terminal 82 and the second junction point 14. Both diodes 86, 88 are poled to pass the input pulses 80 in their easy current flow direction. Although not essential to the circuit's operation, diode 88 preferably has a lower conduction threshold than the diode 86. Resistors also may be used instead of the diodes 86, 88, but at a sacrifice in efficiency.

Figure 2:
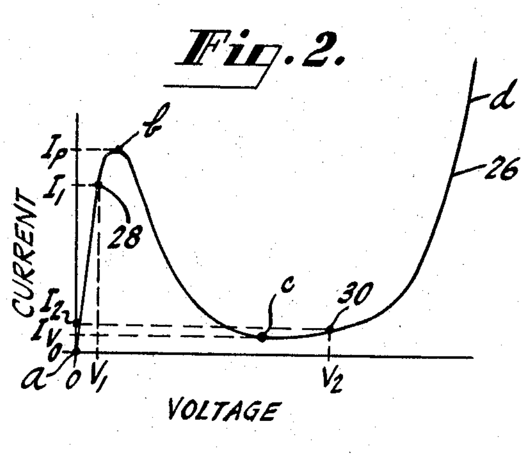
FIGURE 2 is a typical volt-ampere characteristic for a tunnel diode conducting current in the forward direction.

The negative resistance diode 10 is one having a volt-ampere characteristic defined by two regions of positive resistance separated by a region of negative resistance. The volt-ampere characteristic 26 of a typical negative resistance tunnel diode is given in FIGURE 2. In FIGURE 2, voltage across the diode is plotted along the abscissa and current through the diode is plotted along the ordinate. The characteristic curve 26 has a first region *ab* of positive resistance which extends over a range of relatively low voltage values, a second region *cd* of positive resistance that extends over a range of relatively high voltage values, and an intermediate region *bc* of negative resistance.

Assuming that the resistor 20 and battery 22 of FIGURE 1 supply a substantially constant current $I_1$ at second junction 14, the tunnel diode, as will be clear as the discussion proceeds, has a first stable state corresponding to the point 28 in the low voltage region *ab*. The current $I_1$ flows into the diode 10 and the voltage across the diode has a value $V_1$. For a germanium tunnel diode, $V_1$ may be about 30 millivolts. This value of voltage is insufficient to bias first transistor 40 into conduction.

The diode may be switched to a second stable state of relatively high voltage by increasing the diode 10 current above a value $I_p$ corresponding to the peak *b* of the characteristic 26. The stable operating point in the high voltage region is a function of the loading as seen by the tunnel diode, and is assumed to be the point 30. The current through the diode then is $I_2$ and the voltage is $V_2$. For a germanium tunnel diode, for example, $V_2$ may be about 300 millivolts. This voltage is greater than the conduction threshold of the emitter 42-base 44 junction, whereby first transistor 40 conducts when the diode 10 is in the second stable state. It will be seen from a later discussion that diode 34 also conducts at that time. A current $I_1$–$I_2$ divides between diode 34 and the base 44 when diode 10 is in the second stable state.

It may be seen from FIGURE 2 that the operating point 30 can shift over a considerable range of voltage values without a substantial change in diode 10 current. Advantage is taken of this ability in a manner to be described. The diode 10 remains biased in the high voltage state until the current through the diode 10 is reduced below a value $I_v$ corresponding to the valley point *c* on the characteristic 26.

Consider now the operation of the FIGURE 1 circuit. When the circuit is first energized, tunnel diode 10 is in the low voltage state because there is initially no current flow into the diode, and the battery 22 and resistor 20 are chosen to supply a substantially constant current $I_1$ which is less than the peak current of the diode 10. Accordingly, the tunnel diode 10 reaches a stable operating point 28 (FIGURE 2). Second transistor 60 is biased into conduction by battery 18, and the current supplied through resistor 16 divides between tunnel diode 10 and the emitter 62 of second transistor 60. The voltage at first junction 12 is only slightly negative with respect to ground potential because of the ground potential applied at the base 64 of second transistor 60. The emitter 62-base 64 junction of second transistor 60 operates as a threshold device that provides a relatively low A.C. impedance between first junction point 12 and ground when the conduction threshold of the emitter 62-base 64 junction is exceeded. The impedance presented by the transistor 60 is chosen to be much less than the resistance of resistor 16 and the resistance of resistor 20.

The resistor 70 and battery 72 in the collector 66 circuit of second transistor 60 are chosen to provide a desired output voltage at output terminal 68 when transistor 60 is conducting. It may be desired that this voltage be the same as that voltage which appears at the output terminal 52 when first transistor 40 is conducting. Also, the voltage at output terminal 68, when second transistor 60 is nonconducting, preferably should be the same as the voltage at output terminal 52 when first transistor 40 is nonconducting. For this purpose, the battery 72 may have the same value as battery 50 and may, in fact, be the same battery.

When second transistor 60 is in conduction, the voltage at first junction point 12 may be, for example, about —0.3 volt. Tunnel diode 10 is in the low voltage state and the voltage appearing across the terminals of the diode 10 is less than 0.1 volt being of the order of about 50–70 millivolts for a germanium tunnel diode, whereby the voltage at second junction point 14 is less positive than ground potential, and diode 34 is nonconducting. First transistor 40 also is nonconducting at this time because of the very small voltage appearing across its emitter 42-base 44 junction. The voltage at output terminal 52 is close to the value of battery 50.

Assume now that a first positive going trigger pulse 80 is supplied by pulse source 84. Preferably the steering diode 88 has a threshold of conduction which is 0.15 to 0.2 volt lower than the conduction threshold of the other steering diode 86. In that case, diode 88 becomes forward biased and its conduction threshold is exceeded before the conduction threshold of diode 86 is exceeded. The input pulse 80 of current then flows initially through diode 88 to the second junction point 14. Tunnel diode 10 and the emitter 62-base 64 junction of second transistor 60 present a very low A.C. impedance path to the applied input pulse, whereby the input current flows, in the conventional sense, through the tunnel diode 10 and emitter 62-base 64 junction of transistor 60 from second junction point 14 to ground. This current is in a direction to increase the current flow through the tunnel diode 10 and to switch the tunnel diode to the high voltage state.

During the switching transient, the current supplied through resistor 16 remains substantially constant because of the preferred path for current flow through the low input impedance of second transistor 60. Accordingly, the voltage at first junction point 12 remains close to ground potential. Some of the input current may flow through steering diode 86, but this cuurent does not have an adverse effect on the switching of the tunnel diode 10 for the reason that second transistor 60 provides a low impedance path to ground for this current and tends to maintain the voltage constant at first junction point 12.

Once the tunnel diode 10 switches to the high voltage state, the conduction threshold of the emitter 42-base 44 junction of first transistor 40 is exceeded, and first transistor 10 begins to conduct. Tunnel diode 10 current is reduced from about $I_1$ to $I_2$ milliamperes (FIGURE 2) once the diode switches, and a current $I_1$–$I_2$ is available initially as turn-on base current for first transistor 40. The emitter 42 current flowing to junction 12 will tend toward a value $BI_b$, where $I_b$ is the base 44 current and B is the beta of transistor 40. Beta is selected so that the current $BI_b$ plus the tunnel diode current $I_2$ flowing through resistor 16 raises the voltage at first junction point 12 above ground potential to turn-off second transistor 60. The voltage at base 44, and second junction point 14, is higher than the voltage at emitter 42, and first junction 14, by about 300 millivolts, for a germanium transistor.

As the voltage at first junction point 12 rises in a positive direction, the threshold device, diode 34, becomes biased into conduction and clamps the voltage at second junction 14 and base 44 at a fixed voltage value. A portion of the constant current $I_1$ then is shunted away from the base 44 and through the threshold diode 34 to ground. The diode 34 preferably is chosen to have a threshold of conduction which is greater than the drop across the forward biased emitter 42-base 44 junction, in which case the voltage at first junction point 12 is held positive with respect to ground potential and second transistor 60 is maintained in an off condition. In essence, the forward voltage drop across diode 34 and the drop across the emitter 42-base 44 junction of first transistor 40 determine the voltages at second junction point 14 and first junction point 12 when the tunnel diode 10 is in the high voltage state. These voltages, in turn, fix the voltage across tunnel diode 10. The voltage across the tunnel diode 10 may easily adjust to this condition since, as may be seen in FIGURE 2, the voltage across the tunnel diode 10 can vary over a considerable voltage range in the valley region without a substantial change in current flow through the diode 10.

The collector resistor 48 may be chosen in value so that the voltage at output terminal 52 has the same value, when first transistor 40 conducts, as the voltage at output terminal 68 when second transistor 60 conducts. This means that the voltages at the output terminals 52 and 68 are the complements of one another.

Once diode 34 conducts, any small rise in voltage at first junction 12 causes a large increase in the current flow through the low impedance of diode 34. Since the current $I_1$, supplied through resistor 20, is substantially constant, a large increase in current through diode 34 results in a correspondingly large decrease $\Delta I_b$ in base 44 current, and a decrease of $B\Delta I_b$ through resistor 16. This latter decrease in current decreases the voltage at junction 12. On the other hand, a small decrease in voltage at first junction 12 results in a large decrease in diode 34 current, a correspondingly large increase $\Delta I_b$ in base 44 current, and an increase of $B\Delta I_b$ in current through resistor 16. Thus, threshold diode 34 provides very effective clamping action to maintain the voltage constant at first junction 12 and prevent second transistor 60 from conducting.

With tunnel diode 10 in the high voltage state, the voltage at second junction 14 is about 0.3 volt more positive than the voltage at first junction 12. The steering diode 86 then is biased closer to conduction than is the diode 88. Accordingly, the next applied trigger input pulse 80 of current is initially steered through the diode 86 to the first junction point 12. The diode 34 presents a much lower impedance to ground than the resistance of resistor 16, and provides a preferred path for the applied input pulse 80. The input current flows through diode 86, tunnel diode 10 and threshold diode 34 to circuit ground in a direction to reduce the diode 10 current. The input pulse 80 is chosen to be of sufficient magnitude to reduce the diode 10 current below the value of the valley current $I_v$ (FIGURE 2), whereby tunnel diode 10 switches back to the low voltage stable state.

Some of the input current may flow through the upper steering diode 88 and through the threshold diode 34 to ground. Although this latter current reduces the current steered through diode 86 and available for resetting the tunnel diode 10, it does not otherwise have an adverse effect on the switching of the tunnel diode. The reason for this is that the threshold diode 34 clamps the voltage at second junction point 14. Also, very little current flows from diode 88 in a downward direction through tunnel diode 10 and resistor 16 to ground, as is the case in prior art circuits. This latter current, if it flowed, would be in a direction through the diode to hold the diode current at a high value and tend to prevent the resetting thereof.

In summary of the above description, it may be said that second transistor 60 presents a low impedance path to applied input pulses when the tunnel diode is in the low voltage state, and diode 34 presents a very low impedance path to input pulses when the tunnel diode 10 is in the high voltage state. It is primarily by virtue of these low impedance paths that the applied input pulses of current are caused to flow through the tunnel diode 10 in a direction to switch the diode 10 from its then stable state to the opposite stable state. In essence, the circuit employs impedance controlled current steering for the efficient switching of the tunnel diode 10. The efficiency in switching arises by virtue of the fact that the impedance at one terminal of the tunnel diode 10 is very high, relatively speaking, while the impedance to ground at the other terminal of the tunnel diode is simultaneously very low, and vice-versa, although the difference in the voltages at the two terminals of the tunnel diode is relatively small.

In the FIGURE 1 circuit, the threshold diode 34 may be a silicon diode and the tunnel diode may be a gallium-arsenide diode if first transistor 40 is a silicon transistor. If first transistor 40 is a germanium transistor, threshold diode 34 may be a germanium diode and tunnel diode 10 may be a germanium tunnel diode. By way of example only, the various components may have the following values.

*Resistors*

| | Ohms |
|---|---|
| Resistor 18 | 470 |
| Resistor 20 | 1000 |
| Resistor 48 | 1000 |
| Resistor 70 | 1000 |

*Batteries*

| | Volts |
|---|---|
| Battery 18 | 10 |
| Battery 22 | 5 |
| Battery 50 | 20 |
| Battery 72 | 20 |

As is the case in known trigger circuits, the input pulse 80 must not have too great a duration or the circuit might retrigger (double triggering) to its initial state during the same input pulse. Pulse source 84 is chosen to provide pulses of appropriate duration. Pulse source 84 might be, for example, another circuit of the type shown in FIGURE 1, as would be the case in a multistage counter. In that event, the output at terminal 52 could be used to drive the next succeeding stage.

Figures 3, 4, 5:
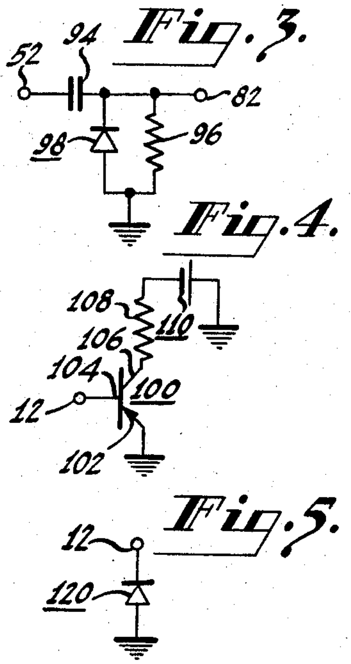
FIGURE 3 is a schematic diagram of a pulse shaping circuit which may be used with the circuit of FIGURE 1.
FIGURE 4 is a schematic diagram of a transistor circuit that may be substituted for the common base transistor in FIGURE 1.
FIGURE 5 is a schematic diagram of a unidirectional conducting device that may be substituted for the common base transistor of FIGURE 1.

It is necessary to convert the wide duration pulse at collector 46 into a relatively short duration pulse for application to the next stage. This may be accomplished, for example, by a coupling arrangement of the type shown in FIGURE 3, in which the terminal 52 is the output terminal of the driver stage and the terminal 82*a* is the input terminal of the next succeeding stage. A capacitor 94 is connected between these terminals, and the parallel combination of a resistor 96 and a diode 98 is connected between the terminal 82 and circuit ground. Capacitor 94 and resistor 96 have values chosen to provide differentiation of the signal applied at terminal 52. Diode 98 furnishes a low impedance path for discharging the capacitor 94 and for clipping the voltage at terminal 82 to prevent the appearance thereat of a signal which is less positive than ground potential.

Although the circuit of FIGURE 1 has been illustrated and described as a trigger circuit, it should be mentioned that the circuit also may be operated as a set-reset flip-flop. In that case, the anodes of input diodes 86, 88 would be connected to separate input terminals. A positive input pulse applied at the anode of diode 86 would switch the tunnel diode 10 to the stable state of low voltage, which might be considered the reset state; a positive input pulse applied at the anode of diode 88 would switch the tunnel diode 10 to the stable state of high voltage, or set state.

In some applications it is unnecessary to provide a pair of output terminals at which complementary output signals are available. In that event, second transistor 60 of FIGURE 1 may be replaced, for example, by a PNP type transistor 100 (FIGURE 4) having its emitter electrode 102 connected to ground and having its base electrode 104 connected at the first junction point 12. The collector electrode 106 is connected through a resistor 108 to the negative terminal of a battery 110 which has a value to reverse bias the collector 106-base 104 junction. The base 104-emitter 102 junction of transistor 100 serves the same threshold function and provides the same low impedance A.C. path for applied input pulses as the base 64-emitter 62 junction of second transistor 60. In addition, transistor 100 is able to provide current gain, which may be of importance in some applications. Operation of the FIGURE 1 circuit with transistor 100 substituted for second transistor 60 is otherwise the same as the operation previously described.

A further modification which may be made in the FIGURE 1 circuit is the substitution of a diode 120 (FIGURE 5) for the second transistor 60 and its related circuitry. That is to say, the diode 120 may be connected at the first junction point 12 and the second transistor 60 may be removed. Diode 120 is a threshold device which may be chosen to have substantially the same threshold of conduction as the emitter 62-base 64 junction of second transistor 60. The diode 120 conducts when the tunnel diode 10 is in the low voltage state and clamps the voltage at first junction point 12 close to ground potential. Also, diode 120 furnishes a very low impedance path for input trigger pulses applied when tunnel diode 10 is in the low voltage state.

Other modifications to the FIGURE 1 circuit are possible without departing from the spirit of the invention. For example, first and second transistors 40, 60 may be PNP type transistors, provided that the connections to the various diodes 34, 86, 88 and tunnel diode 10 are reversed, and provided further that the various batteries are connected to supply voltages of the opposite polarity. Also, pulse source 84 would be one which supplied negative going trigger pulses.

What is claimed is:

1. The combination comprising:
first and second points;
a transistor of one conductivity type having an emittel connected to the first point, a base connected to the second point, and a collector;
a negative resistance diode having a forward volt-ampere characteristic defined by two regions of positive resistance separated by a region of negative resistance;
means connecting said diode between said points in a polarity direction to conduct forward current in the same direction, relative to the second point, as the direction of easy current flow across the emitter-base junction of the first transistor;
a point of reference potential;
current source means connected between the first point and the point of reference potential;
a second transistor of said one conductivity type having an emitter connected to the first point, a base connected to the point of reference potential, and a collector;
means operatively connected between the second point and the point of reference potential and having a value to bias said diode bistably;
a threshold device connected between the second point and the reference point in a manner to conduct current in the same direction, relative to the second point, as the direction of forward current through said diode, said device having a threshold of conduction that is higher than the conduction threshold of said emitter-base junction;
a first coupling device having one terminal connected at the first point;
a second coupling device having a terminal connected at the second point;
means for applying input signals at the other terminals of the first and second coupling devices; and
means for applying operating potentials between the point of reference potential and the collectors of the first and second transistors.

2. The combination as claimed in claim 1, wherein the first and second coupling devices are first and second unidirectional conducting devices, and wherein the second unidirectional conducting device has a lower threshold of conduction than the first unidirectional conducting device.

3. The combination comprising:
first and second points;
a first transistor having an emitter and a base connected to different ones of the points, and having also a collector;
a point of reference potential;
a second transistor having an emitter and a base connected to different ones of the first point and the point of reference potential, and having also a collector;
current supply means connected between the first point and the point of reference potential;
a negative resistance diode connected between said two points and having a forward volt-ampere characteristic defined by first and second regions of positive resistance separated by a region of negative resistance;
bias means connected to said diode and having a value to bias the diode bistably;
a threshold device connected between the second point and the point of reference potential, and being connected to conduct current in the same direction, relative to the second point, as the direction of forward diode current;
a first input coupling device having one terminal connected at the first point;
a second input coupling device having one terminal connected at the second point;
means for applying input signals at the other terminals of the first and second input coupling devices; and
means for applying operating potential between the point of reference potential and the collector of each transistor.

4. The combination as claimed in claim 3, wherein said threshold device has a conducting threshold that is greater in magnitude than the conducting threshold of the emitter-base junction of the first transistor.

5. The combination as claimed in claim 3, wherein said other terminals of the first and second input coupling devices are connected together and to said means for applying input signals, said first and second coupling devices are first and second unidirectional conducting devices, respectively, and said second conducting device has a lower threshold of conduction than the first unidirectional conducting device.

6. The combination comprising:
first and second points, and a point of reference potential;
a transistor having an emitter-base diode connected between the first and second points, and having also a collector;
output means coupled to said collector;
current supply means connected between the first point and the point of reference potential;
diode means connected between the first point and said point of reference potential, and being poled to conduct current from said current supply means in the easy current flow direction of the diode;
a negative resistance diode connected between the first and second points and having a volt-ampere characteristic defined by two regions of positive resistance separated by a region of negative resistance;
bias means connected to said negative resistance diode and having a valve to bias the negative resistance diode bistably;
a threshold device connected between the second point and the point of reference potential, and having a threshold of conduction which is exceeded by the voltage at said second point when said diode is in a single one of its two stable states;
a first coupling device having one terminal connected at the first point;
a second coupling device having one terminal connected at the second point; and
means for applying input signals at the other terminals of said coupling devices.

7. The combination as claimed in claim 6, wherein the first and second coupling devices are first and second unidirectional conducting devices, respectively, and wherein the first unidirectional conducting device has a higher conduction threshold than the first unidirectional conducting device.

8. The combination as claimed in claim 6, wherein the direction of easy current flow across the emitter-base diode of the transistor, the direction of forward current thorugh the negative resistance diode, and the direction of forward current through the diode means are all in the same direction relative to the first point.

9. The combination comprising:

first and second points and a point of reference potential;

a negative resistance diode connected between said first and second points and having a volt-ampere characteristic defined by first and second regions of positive resistance at relatively low and relatively high values of voltage, respectively, separated by a region of negative resistance;

means including a resistor connected between the first point and the reference point;

bias means connected between the second point and the reference point and having a value to bias the diode bistably, whereby said diode has a first stable state and a second stable state respectively corresponding to operating points in the first and second regions of positive resistance;

a first device having a conduction path operatively connected between the first point and the reference point, and having a threshold of conduction that is respectively less than and greater than the voltage at the first point when the diode is biased in said first stable state and said second stable state;

a second device having a conduction path operatively connected between the second point and the reference point, and having a threshold of conduction that is respectively greater than and less than the voltage at the second point when the diode is biased in said first stable state and said second stable state;

an input terminal;

first and second coupling elements each connected between the input terminal and a different one of the first and second points; and means for applying input pulses at said input terminal.

10. The combination comprising:

first and second points and a point of reference potential;

a negative resistance diode connected between the first and second points and having a volt-ampere characteristic defined by first and second regions of positive resistance at relatively low and relatively high values of voltage, respectively, separated by a region of negative resistance;

means including a first resistance element connected between the first point and the point of reference potential;

bias means including a second resistance element connected between the second point and the point of reference potential, said bias means having a value to bias the negative resistance diode bistably in either a first stable state in said first region of relatively low voltage or a second stable state in said second region of relatively high voltage;

a first device having a conduction path operatively connected between the first point and the point of reference potential, said first device having a conduction threshold which is respectively less than and greater than the voltage at said first point when the diode is in said first stable state and said second stable state;

a second device having a conduction path operatively connected between the second point and the point of reference potential, said second device having a conduction threshold which is respectively greater than and less than the voltage at said second point when the diode is in said first stable state and said second stable state;

each said device having, when its threshold is exceeded, an impedance that is of lesser magnitude than the resistance of either the first or second resistance elements;

a first coupling element having a terminal connected at the first point;

a second coupling element having a terminal connected at the second point; and means for applying input signals at the other terminals of the first and second coupling elements.

References Cited by the Examiner

UNITED STATES PATENTS

| | | | |
|---|---|---|---|
| 3,054,002 | 9/1962 | Tendick | 307—88.5 |
| 3,061,743 | 10/1962 | Fukui | 307—88.5 |

ARTHUR GAUSS, *Primary Examiner.*

D. D. FORRER, *Assistant Examiner.*